United States Patent Office
2,802,022
Patented Aug. 6, 1957

2,802,022
METHOD OF PREPARING A POLYURETHANE

Stephen J. Groszos, Darien, and Erhart K. Drechsel, Springdale, Conn., assignors to American Cyanamid Company, New York, N. Y., a corporation of Maine No Drawing. Application December 15, 1954, Serial No. 475,566

8 Claims. (Cl. 260—471)

This invention relates to a method of preparing a chemical compound or mixture of chemical compounds, and more particularly is concerned with a novel and economical method of preparing polyurethanes (polycarbamates), e. g., di-, tri-, tetra-, penta-, hexa, deca-, octadeca-, etc., urethanes. Still more particularly the invention relates to the new and improved method of preparing a polyurethane (including mixtures thereof) which comprises reacting urea with a hydroxy carbamate, especially a primary or secondary hydroxy carbamate and preferably the former.

The hydroxy carbamate reactants employed in practicing the present invention may be defined more specifically as a monohydroxy monocarbamate, monohydroxy polycarbamate, polyhydroxy monocarbamate or polyhydroxy polycarbamate, and more particularly such carbamates wherein the hydroxy groups are primary or secondary, or both primary and secondary in the case of the polyhydroxy carbamates.

Various methods are known for preparing polyurethanes. For example, U. S. Patent No. 1,817,992 describes the preparation of 1,3-butylene diurethane (also sometimes designated as "1,3-butyleneglycol diurethane"), and having the formula (I)
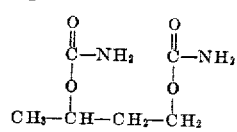

by causing urea (200 parts) to react for 4 hours at 170–180° C. with a molecular excess of butylene glycol (500 parts). Paquin [Z. Naturforsch., 1, 518–523 (1946)] prepared 1,3-butylene diurethane by reacting a mixture of urea (2 moles) and 1,3-butylene glycol (1 mole) for 5 hours at 180–200° C., using zinc acetate as a catalyst for the reaction. In PB Report No. 20,526, Frame Nos. 1558–1561, is described the preparation of 1,4-butylene diurethane by heating together 180 parts (2 moles) 1,4-butylene glycol, 320 parts (5.3 moles) urea, 200 parts xylene and 4 parts stannic chloride (catalyst) at the reflux temperature (137–141° C.) for 8 hours. The so-called "glycol-urea" processes of preparing a diurethane, such as those described above, have the disadvantage that the products of the process are limited in their character, the only variations arising from the use of diffferent glycols. For instance, the process does not and cannot provide the various N-substituted polyurethanes or polyurethanes wherein some of the amide nitrogen atoms are substituted while others are unsubstituted.

The present invention is based on our discovery that a hydroxy carbamate, especially those described more specifically in the first two paragraphs of this specification (as well as elsewhere herein), or mixtures thereof in any proportions, can be reacted with urea to form the corresponding polyurethane or mixture of polyurethanes. The process makes possible the production of diurethanes, such as those which can be made by the above-described "glycol-urea" process; and, in addition, polyurethanes containing different carbamyl groupings that cannot be made by the aforesaid process of the prior art. Furthermore, the process is more economical and obviates the disadvantages of making a polyurethane by heating, for example, a monohydroxyalkyl monocarbamate alone since there is no glycol by-product of the reaction and one mole of relatively inexpensive urea replaces one mole of the more expensive monohydroxyalkyl monocarbamate.

The starting hydroxy carbamates used in practicing our invention are prepared by known methods. One convenient method comprises reacting a cyclic carbonate with ammonia, a primary amine, a secondary amine, or a polyamine containing two or more primary amino groups, or two or more secondary amino groups, or one or more primary amino groups and, also, one or more secondary amino groups. A preferred class of cyclic carbonates employed in producing a preferred class of hydroxy carbamate starting reactant are carbonates represented by the following general formula:

(II)
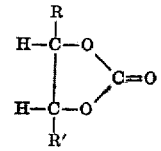

in which R and R', which may be the same or different, represent hydrogen or a monovalent hydrocarbon radical, e. g., alkyl, aralkyl, cycloalkyl, alkenyl, aryl, alkaryl and others such as those mentioned in column 2, lines 20–32, of U. S. Patent No. 2,582,594. More specific examples of such cyclic carbonates are ethylene carbonate and its homologues, e. g., propylene carbonate, butylene carbonate, etc.; also, erythryl carbonate (vinyl ethylene carbonate). For a detailed description of the process employed in making hydroxy carbamates by reacting ammonia with a cyclic carbonate of the kind embraced by Formula II, see U. S. Patent No. 2,627,524— Malkemus. Essentially the same procedure described in this patent is followed when, instead of ammonia, there is used a primary amine (primary monoamine), a secondary amine (secondary monoamine) or a polyamine of the kind aforementioned. In the case of polyamines, however, one should use the cyclic carbonate and polyamine in the ratio of one mole of cyclic carbonate for each hydrogen-containing amino group that it is desired to react therewith.

The following equation illustrates the reaction between a cyclic carbonate and a polyamine to produce a hydroxy carbamate and wherein ethylene carbonate is taken as illustrative of the cyclic carbonate and 1,3-diaminopropane as illustrative of the polyamine:

(III)
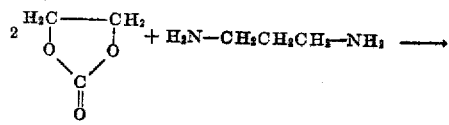

Illustrative examples of amines that can be used as a reactant with a cyclic carbonate to produce the hydroxy carbamate starting reactant are methyl amine, dimethyl amine, hexyl amine, dihexyl amine, decyl amine, N-ethylbutyl amine (C₂H₅NHC₄H₇), 1,4 - diaminobutane, ethylene diamine, triethylene tetramine, bis(3-aminopropyl)ether, N-butylaniline, hydrazine, the various primary and secondary alkanol amines, including mono- and diethanol amine, mono- and dipropanol amine, etc., and other amines of the general class above set forth. Additional examples of amines that can be employed as a reactant with a cyclic carbonate to yield a hydroxy carbamate which is useful as a reactant with urea are given in, for example, column 18, lines 3–75, of U. S. Patent No. 2,582,594.

Two sub-classes of carbamates which are particularly useful as a reactant with urea to form a polyurethane are carbamates represented by the general formula (IV) 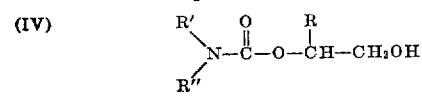

where R, R' and R" each represents hydrogen or a monovalent hydrocarbon radical; and carbamates represented by the general formula (V) 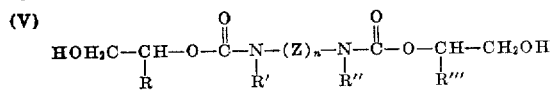

where R, R', R" and R'" each have the same meaning given above with reference to R, R' and R" of Formula IV, Z represents a divalent radical selected from the class consisting of divalent hydrocarbon radicals, divalent aminohydrocarbon radicals, divalent oxyhydrocarbon radicals and divalent hydroxyhydrocarbon radicals, and $n$ represents a positive integer, e. g. 1, 2, 3, 5, 10, or even 20 or more if the amines corresponding to the hydroxycarbamates of Formula V are available.

Illustrative examples of divalent radicals represented by Z in Formula V are divalent aliphatic hydrocarbon radicals, e. g., methylene, ethylene, propylene (trimethylene), propenylene, butylene, isobutylene, pentylene, isopentylene, decamethylene, octadecamethylene, etc., including divalent cycloaliphatic hydrocarbon radicals, e. g., cyclopentylene, cyclopentenylene, cyclohexylene, cyclohexenylene, cycloheptylene, etc.; divalent aromatic hydrocarbon radicals, e. g., phenylene, biphenylene, naphthylene, etc.; divalent aliphatic-substituted aromatic hydrocarbon radicals, e. g., 2,4 - tolylene, ethyl-2,5-phenylene, isopropyl-3,4-phenylene, 1-butyl - 2,4 - naphthylene, etc.; divalent aromatic-substituted aliphatic hydrocarbon radicals, e. g., phenylethylene, phenylpropylene, naphthylisobutylene, xylylene, alpha-(4 - tolylene) beta' - butyl, etc.; and radicals that may be classed either as divalent aromatic-substituted aliphatic or divalent aliphatic-substituted aromatic hydrocarbon radicals, e. g., 4,alpha-tolylene, 3,beta-phenyleneethyl, 4,alpha-xylylene, 2,gamma-phenylenebutyl, etc.; and the corresponding divalent amino (—NH—), including mono- and polyamino, oxy (including mono- and polyoxy) and hydroxy (including mono- and polyhydroxy) hydrocarbon radicals.

Taking a hydroxy carbamate of the kind embraced by Formula IV as illustrative of the carbamate reactant, the reaction with urea may be illustrated by the following equation:

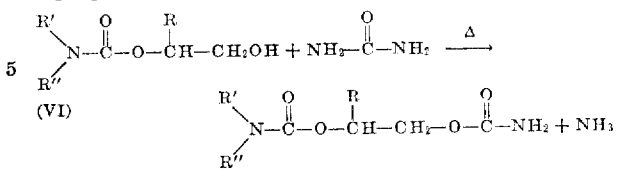

(VI)

Taking a hydroxy carbamate of the kind embraced by Formula V as illustrative of the carbamate reactant, the reaction with one mole of urea may be illustrated by the following equation:

(VII)

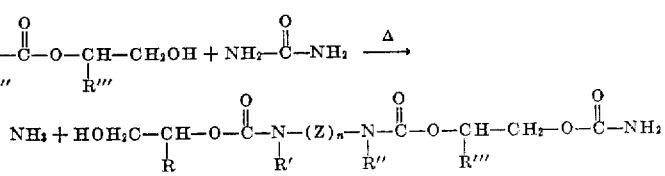

and with two moles of urea the reaction may be illustrated by the following equation:

(VIII)

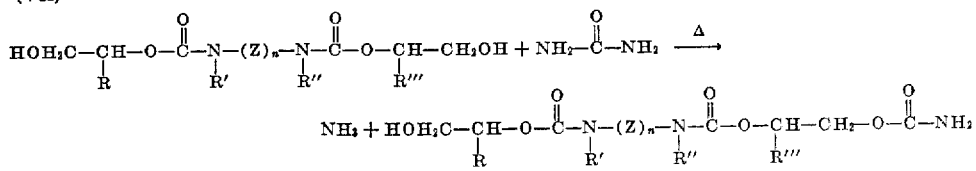

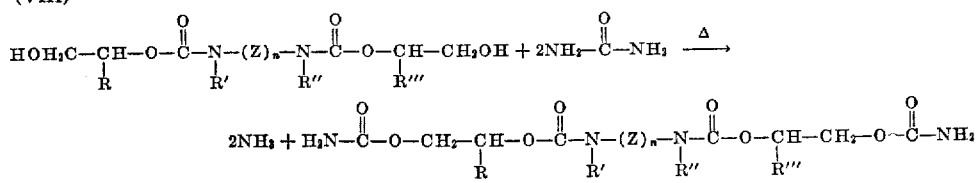

Illustrative examples of monovalent hydrocarbon radicals which R, R', R" and R'" of the above Formulas IV, V, VI and VII can represent are the same as those aforementioned with reference to R and R' of Formula II.

We are unable to state with certainty why urea is capable of reacting under heat, e. g., at a temperature of from about 100° C. to about 200° C., with a hydroxy carbamate, but it is possible that it is because the urea acts as a source of cyanic or isocyanic acid (or, perhaps more likely, an equilibrium mixture of the two) as indicated below:

(IX) 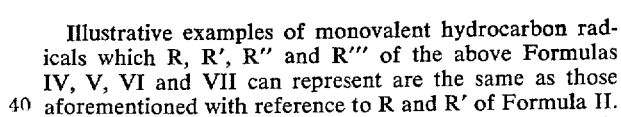

The cyanic or isocyanic acid or equilibrium mixture thereof then reacts with the hydroxy group to form a carbamyl group.

The reaction between the urea and the hydroxy carbamate, or mixture of hydroxy carbamates in any proportions, is effected under heat, usually at an elevated temperature such as above mentioned by way of illustration, and still more particularly at a temperature of from about 110–115° C. to 175–185° C. The reaction can be effected with or without the aid of a catalyst, but preferably a catalyst is employed, more particularly a Lewis acid catalyst, including Friedel-Crafts catalysts such, for instance, as stannic chloride, boron chloride, boron fluoride, aluminum chloride, aluminum bromide, ferric bromide, antimony trichloride, antimony tribromide, ferric chloride, stannic bromide, titanium tetrachloride, arsenic trichloride, arsenic tribromide, zirconium tetrachloride, sulfuric acid, etc.

The reaction can be carried out in the presence or absence of a solvent or diluent which is inert during the reaction. If a solvent or diluent be employed, we prefer to use one having a boiling point of at least 100° C., e. g., from 100° to 200° C. Examples of suitable solvents or diluents that can be used are toluene, xylene, p-cymene, dioxane, dibutyl phthalate, diethyl ether of ethylene glycol, the various N-hydrocarbon-substituted amides (including dimethyl formamide), nitrobenzene, and others which will be apparent to those skilled in the art from those just named.

The molar ratios of reactants and conditions of reaction can be widely varied depending, for instance, upon the particular starting reactants employed and the particular properties desired in the end products. Ordinarily, however, the urea reactant is employed in an amount corresponding to from about 1 to about 1.5 moles of urea for each hydroxy group in the hydroxy carbamate that one desires to convert to a carbamyl group. The use of urea in further excess than that indicated above is not precluded, in which case it can function primarily as a diluent during the reaction; however, large excesses of urea are generally undesirable because the isolation of the polyurethane end-product then may be more difficult.

If a catalyst be employed, the amount thereof can be considerably varied, e. g., up to about 10%, preferably up to about 5%, by weight of the hydroxy carbamate starting reactant.

The time of reaction will vary widely depending, for instance, upon the particular starting reactants employed, reaction temperature, whether or not a catalyst is used, etc. At the lower reaction temperatures, e. g., 100–150° C., the reaction period may be as long as 15 hours or more. At higher reaction temperatures, e. g., 160–200° C., the reaction may proceed to completion in less than about 8 hours, e. g., in from about 2 to about 4 hours.

In some cases, e. g., when the product is to be used as an intermediate in making certain resins, the crude polyurethane can be employed directly as such without isolation from the reaction mass. However, if desired, the polyurethane resulting from the reaction can be isolated by any suitable means. For example, if a solvent or diluent has been used, it can be removed by azeotropic distillation after adding an equal amount of ethanol to the reaction mass, followed by cooling the resulting ethanol solution of the polyurethane. The latter is then isolated from the ethanol solution by conventional means, for instance as described under Example 1.

A variation of the above method of isolating the polyurethane involves removal of the solvent by vacuum distillation to yield crude polyurethane, which then can be purified if desired by any suitable means.

When no solvent is employed, the crude product is merely dissolved in a suitable solvent, e. g., hot methanol or ethanol, whereupon the polyurethane crystallizes out on cooling. A variation of this is to use water in place of methanol or ethanol. Water is the best solvent for recrystallization because urea is much more soluble in this solvent cold than the polyurethanes, e. g., ethylene diurethane (ethylene dicarbamate), which is soluble in hot water but only slightly soluble at room temperature.

It will be noted from the foregoing and from the examples which follow, that the present invention provides a method of preparing a polyurethane which comprises reacting together, as sole reactants, urea and at least one hydroxy carbamate selected from the class consisting of primary and secondary β-hydroxy carbamates in which the —OH is attached directly to aliphatic carbon, for example a primary or secondary mono-β-hydroxy monocarbamate or polycarbamate, or a primary or secondary poly-β-hydroxy monocarbamate or polycarbamate.

In order that those skilled in the art may better understand how the present invention can be carried into effect, the following examples are given by way of illustration and not by way of limitation. All parts and percentages are by weight.

*Example 1*

|  | Parts | Approx. Molar Ratio |
|---|---|---|
| Beta-hydroxyethyl carbamate | 172 | 1.0 |
| Urea | 144 | 1.5 |

The above reactants are heated together in a reaction vessel placed in an oil bath which is maintained at 115–120° C. The evolution of ammonia is quite vigorous for the first one and one-half hours. Heating is continued for another 12 hours at 120–125° C. The resulting product is dissolved in absolute ethanol, cooled, the crystals (urea) are filtered off and the filtrate is evaporated on a steam bath, yielding a clear, colorless oil. On standing at room temperature, crystals are deposited from this oil. These crystals are filtered off, washed with acetone and air-dried; M. P. 150–153° C. The product is shown by infrared spectrum to be identical with that of a known sample of ethylene diurethane.

*Example 2*

|  | Parts | Approx. Molar Ratio |
|---|---|---|
| Beta-hydroxyethyl carbamate | 172 | 1.0 |
| Urea | 108 | 1.1 |
| Stannic chloride | 11 |  | are charged together to an open reaction vessel with nitrogen gas bubbling therethrough. The ingredients are heated for 6 hours at 140° C. in this vessel placed in a 140° C. oil bath. Ammonia evolves during the reaction. The reaction mass is poured into about 475 parts of absolute ethanol. After standing for several hours, crystals of ethylene diurethane (M. P. 162.5–165° C.) separate. These crystals are purified by recrystallization from water, yielding a purified product which melts at 167–169° C. The constitution of the product is confirmed by mixed melting point determinations and by infrared spectrum.

*Example 3*

|  | Parts | Approx. Molar Ratio |
|---|---|---|
| Beta-hydroxyethyl carbamate | 162 | 1.0 |
| Urea | 144 | 1.5 |
| Stannic chloride | 11 |  |
| Xylene | 305 |  |

The above ingredients are thoroughly mixed and then heated under reflux at the boiling temperature of the reaction mass for 20 minutes. Absolute ethanol (305 parts) is then added, and the xylene is removed by azeotropic distillation. This requires about 2¾ hours. At the end of this period of time the resulting, clear, light-yellow solution is allowed to cool and to stand at room temperature for 2 days. It is then chilled for 2 hours, and the crystals of ethylene diurethane which separate are filtered off, washed with ethanol and air-dried. After recrystallization from water, a purified product melting at 172–173° C. is obtained.

Analysis:

|  | Percent C | Percent H | Percent N |
|---|---|---|---|
| Calculated for $C_4H_8O_4N_2$ | 32.43 | 5.40 | 18.91 |
| Found | 32.65 | 5.49 | 19.00 |

*Example 4*

This example illustrates the use of a different hydroxy carbamate in practicing the present invention, namely, one represented by the formula (X) 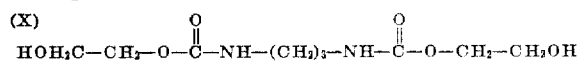

and which may be named N,N'-trimethylene-bis(beta-hydroxyethyl) carbamate. It is prepared by the reaction of 2 moles of ethylene carbonate with one mole of trimethylene diamine.

|  | Parts | Approx. Molar Ratio |
|---|---|---|
| Hydroxy carbamate of Formula X | 250 | 1.0 |
| Urea | 66 | 1.1 |

The above reactants are heated together at 100–125° C. At about 90° C., solution is complete. The reaction mass is maintained at 100–125° C. for 6 hours, during which time ammonia is evolved. The reaction mass, at the end of this period of reaction, is dissolved in hot ethanol and the resulting solution is allowed to cool slowly, whereupon a crystalline solid comprising the desired polyurethane is deposited. After filtering, washing with ethanol and air-drying, the polyurethane is in the form of plate-like crystals, M. P. 95–100° C.

*Example 5*

The hydroxy carbamate used in this example has the following formula:

(XI) 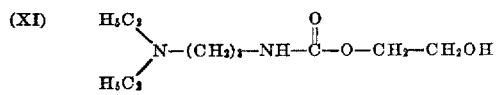

and is prepared by reaction of diethylaminopropyl amine with ethylene carbonate.

|  | Parts | Approx. Molar Ratio |
|---|---|---|
| Hydroxy carbamate of Formula XI | 218 | 1.0 |
| Urea | 66 | 1.1 |
| Stannic chloride | 11 |  | are heated together at 140–160° C. for 8 hours, after which the reaction mass is dissolved in 200 parts of hot water, allowed to cool and the diurethane which separates is filtered off, washed with acetone and air-dried. The diurethane of this example has the formula (XII) 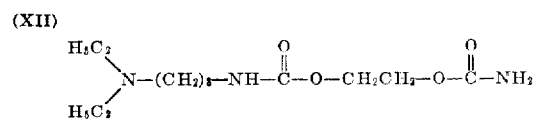

*Example 6*

The hydroxy carbamate used in this example has the following formula:

(XIII) 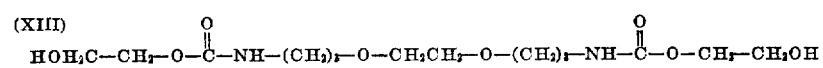

It is prepared by reacting 2 moles of ethylene carbonate with 1 mole of 4,7-dioxadecane-1,10-diamine.

|  | Parts | Approx. Molar Ratio |
|---|---|---|
| Hydroxy carbamate of Formula XIII | 352 | 1.0 |
| Urea | 90 | 1.5 |
| Stannic chloride | 15 |  | are heated together at 145–155° C. for 8 hours, after which the reaction mass is dissolved in hot water, allowed to cool, and the polyurethane which separates is filtered off, washed with acetone and air-dried.

*Example 7*

The hydroxy carbamate used in this example has the following formula:

(XIV) 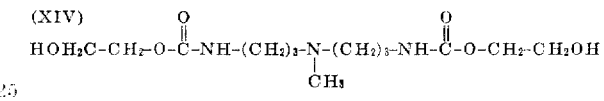

and is prepared by reacting 1 mole of N-methylamino-bis(propylamine) with 2 moles of ethylene carbonate.

|  | Parts | Approx. Molar Ratio |
|---|---|---|
| Hydroxy carbamate of Formula XIV | 321 | 1.0 |
| Urea | 90 | 1.5 |
| Stannic chloride | 30 |  | are heated together at 185–190° C. for 3 hours, after which the reaction mass is added to water, neutralized with 0.5 N aqueous sodium hydroxide solution, filtered hot, and then allowed to cool whereupon a crystalline product comprising the desired polyurethane separates. It is isolated by filtration through a Büchner funnel, washed with acetone and air-dried.

*Example 8*

The hydroxy carbamate used in this example has the following formula:

(XV) 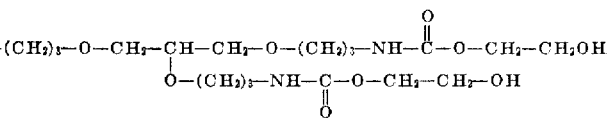

It is prepared by cyanoethylation of glycerol to give tris(beta-cyanoethoxy)-propane-1,2,3 as described, for example, in Bruson U. S. Patent No. 2,401,607, followed by reduction to the corresponding triamine and reaction of this triamine with 3 moles of ethylene carbonate to give the hydroxy carbamate of Formula XV.

|  | Parts | Approx. Molar Ratio |
|---|---|---|
| Hydroxy carbamate of Formula XV | 525 | 1.0 |
| Urea | 120 | 2.0 |
| Stannic chloride | 38 |  | are heated together, reacted and the polyurethane end-product is isolated as described under Example 7.

*Example 9*

The hydroxy carbamate used in this example has the following formula:

(XVI)
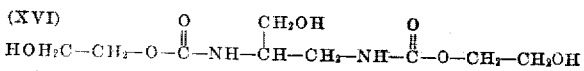
HOH$_2$C—CH$_2$—O—C(=O)—NH—CH(CH$_2$OH)—CH$_2$—NH—C(=O)—O—CH$_2$—CH$_2$OH It is prepared by reacting 2 moles of ethylene carbonate with 1 mole of 2,3-diaminopropanol.

|  | Parts | Approx. Molar Ratio |
|---|---|---|
| Hydroxy carbamate of Formula XVI | 266 | 1.0 |
| Urea | 240 | 4.0 |
| Stannic chloride | 15 |  |

The above ingredients are heated together at 160–170° C. for 8 hours, after which the reaction mass is cooled, disolved in hot water, and 0.5 N aqueous sodium hydroxide solution is added until the solution is basic to pH paper. The resulting solution is filtered and the filtrate is cooled, whereupon the triurethane separates. It is isolated by collection on a Büchner funnel, washed with acetone and air-dried. The product has the formula.

(XVII)
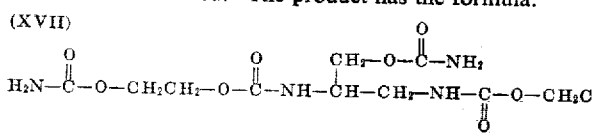
H$_2$N—C(=O)—O—CH$_2$CH$_2$—O—C(=O)—NH—CH(CH$_2$—O—C(=O)—NH$_2$)—CH$_2$—NH—C(=O)—O—CH$_2$CH$_2$—O—C(=O)—NH$_2$

*Example 10*

The hydroxy carbamate used in this example has the following formula (XVIII)
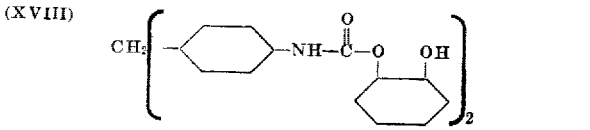

It is prepared by reacting 2 moles of phenylene carbonate with 1 mole of methylene-bis-aniline.

|  | Parts | Approx. Molar Ratio |
|---|---|---|
| Hydroxy carbamate of Formula XVIII | 470 | 1.0 |
| Urea | 150 | 2.5 | are heated together at 150–170° C. for 10 hours. The reaction mass is then cooled, dissolved in warm dioxane, treated with decolorizing carbon and filtered. It is re-precipitated from the filtered solution by adding the solution to strongly agitated cold water. The polyurethane is filtered off and dried. The product has the formula (XIX)
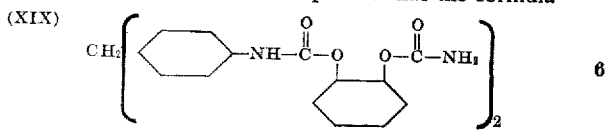

*Example 11*

The hydroxy carbamate used in this example has the following formula:

(XX)
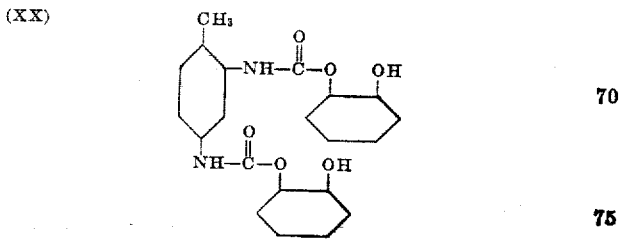

It is prepared by reacting 2 moles of phenylene carbonate with 1 mole of 2,4-diaminotoluene.

|  | Parts | Approx. Molar Ratio |
|---|---|---|
| Hydroxy carbamate of Formula XX | 394 | 1.0 |
| Urea | 150 | 2.5 |

The same procedure is followed as described under Example 10. The polyurethane end-product has the formula (XXI)
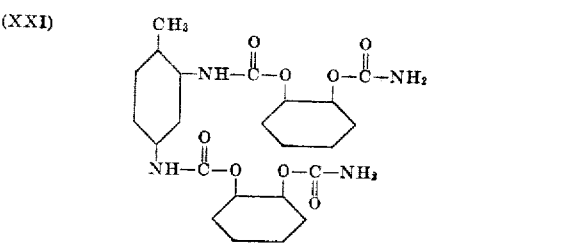

*Example 12*

The hydroxy carbamate used in this example has the following formula:

(XXII)
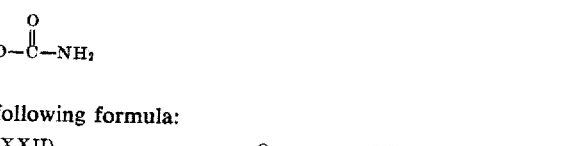
CH$_2$(—CH$_2$—NH—C(=O)—O—CH(CH$_3$)—CH(CH$_3$)—OH)$_2$

It is prepared by reacting 2 moles of 2,3-butylene carbonate with 1 mole of trimethylene diamine.

|  | Parts | Approx. Molar Ratio |
|---|---|---|
| Hydroxy carbamate of Formula XXII | 306 | 1.0 |
| Urea | 150 | 2.5 |
| Stannic chloride | 12 |  |

The same procedure is followed as described under Example 4. The polyurethane end-product has the formula (XXIII)
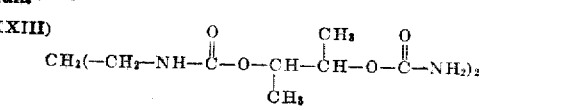
CH$_2$(—CH$_2$—NH—C(=O)—O—CH(CH$_3$)—CH(CH$_3$)—O—C(=O)—NH$_2$)$_2$

*Example 13*

The hydroxy carbamate used in this example has the following formula:

(XXIV)
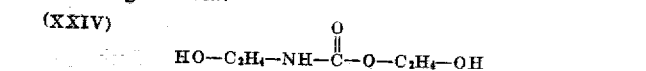
HO—C$_2$H$_4$—NH—C(=O)—O—C$_2$H$_4$—OH

It is prepared by reacting 1 mole of ethylene carbonate with 1 mole of ethanolamine (monoethanolamine).

|  | Parts | Approx. Molar Ratio |
|---|---|---|
| Hydroxy carbamate of Formula XXIV | 149 | 1.0 |
| Urea | 150 | 2.5 |

The same procedure is followed as described under

Example 1. The polyurethane end-product has the formula (XXV)
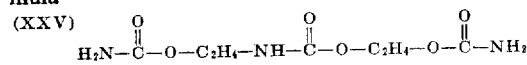

Example 14

The hydroxy carbamate used in this example has the following formula:

(XXVI)
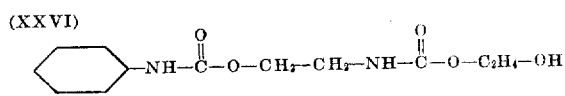

It is prepared by reacting the hydroxy carbamate of Formula XXIV with phenyl isocyanate.

|  | Parts | Approx. Molar Ratio |
|---|---|---|
| Hydroxy carbamate of Formula XXVI | 248 | 1.0 |
| Urea | 72 | 1.2 |

The same procedure is followed as described under Example 1. The polyurethane end-product has the formula:

(XXVII)
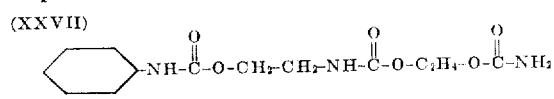

Example 15

The hydroxy carbamate used in this example has the following formula:

(XXVIII)
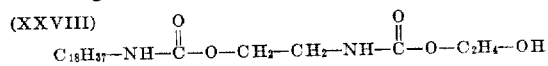

It is prepared by reacting the hydroxy carbamate of Formula XXIV with stearyl isocyanate.

|  | Parts | Approx. Molar Ratio |
|---|---|---|
| Hydroxy carbamate of Formula XXVIII | 324 | 1.00 |
| Urea | 75 | 1.25 |

The same procedure is followed as described under Example 1. The polyurethane end-product has the formula:

(XXIX)
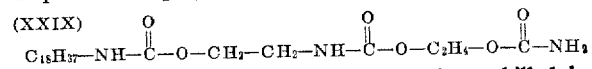

It will be understood, of course, by those skilled in the art that our invention is not limited to the specific ingredients or reactants, proportions thereof, temperatures and time of reaction, processing steps and other conditions that have been given in the foregoing examples by way of illustration. Thus, instead of the particular hydroxy carbamate named in the individual examples, we can use mixtures of any or all of them in any proportions if we so desired.

Other examples of hydroxy carbamates that can be used as a starting reactant, and detailed methods of preparing the same, are disclosed in the copending applications of one of us (Erhart K. Drechsel), Serial No. 300,970, filed July 25, 1952, and now abandoned, and Serial Nos. 424,281 and 424,282, each filed April 19, 1954. Such hydroxy carbamates include compounds represented by the general formula (XXX)
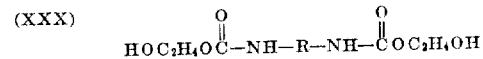

wherein R represents a radical of the class consisting of —$C_nH_{2n}$— and —$C_nH_{2n}$—O—$C_nH_{2n}$—, where $n$ is a positive integer, e. g., from 1 to 12, or even as high as 18 or more; also, compounds represented by the general formula (XXXI)
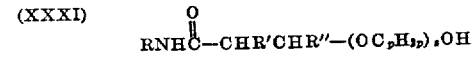

wherein R represents $C_nH_{2n+1}$— or $C_xH_{2x+1}$—O—$C_yH_{2y}$— and wherein $n$ is a whole number (positive integer) from 8 through 18, $x$ and $y$ are whole numbers from 1 through 18 such that the sum of $x+y$ equals from 8 through 18; R' and R" represent hydrogen, methyl or hydroxymethyl; $p$ is a whole number from 2 through 3; and $z$ is a number between 1 and about 200; also, compounds represented by the general formula (XXXII)
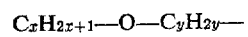

where R, R' and R" have the same meanings just given with reference to Formula XXXI.

Still other examples of reactive hydroxy carbamates (hydroxy carbamates which are reactive with urea) will be apparent to those skilled in the art from the foregoing examples of classes, subclasses and species of hydroxy carbamates that have been given by way of illustration.

Likewise, catalysts other than stannic chloride employed in some of the examples can be used if desired, for instance other Lewis acid catalysts such as those named hereinbefore as illustrative examples of catalysts that can be employed.

The polyurethanes produced by the method of this invention have a wide variety of industrial applications, for instance as resin-forming intermediates (e. g., as a reactant with an aldehyde including formaldehyde). The resinous or potentially resinous aldehyde-reaction products are useful, for instance, as surface-coating compositions, textile-treating agents (or as components of such compositions and agents), and for numerous other purposes.

We claim:

1. The method of preparing a polyurethane which comprises reacting together, as sole reactants, urea and at least one hydroxy carbamate selected from the class consisting of primary and secondary β-hydroxy carbamates in which the —OH is attached directly to aliphatic carbon.

2. A method as in claim 6 wherein the catalyst is a Lewis acid catalyst.

3. The method of preparing a polyurethane which comprises reacting together, as sole reactants, urea and a carbamate represented by the formula

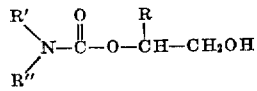

where R, R' and R" each represents a member of the class consisting of hydrogen and monovalent hydrocarbon radicals, said reaction being effected at a temperature between about 100° C. and about 200° C. and in the presence of a catalyst for the reaction, and isolating the resulting polyurethane from the reaction mass.

4. The method of preparing a polyurethane which comprises reacting together, as sole reactants, urea and a carbamate represented by the formula

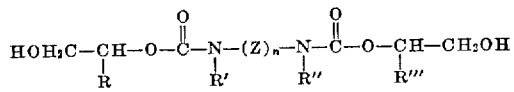

where R, R', R" and R''' each represents a member of the class consisting of hydrogen and monovalent hydrocarbon radicals, Z represents a divalent radical selected from the class consisting of divalent hydrocarbon radicals, divalent aminohydrocarbon radicals, divalent oxyhydrocarbon radicals and divalent hydroxyhydrocarbon radicals, and $n$ represents a positive integer, said reaction being effected at a temperature between about 100° C. and about 200° C. and in the presence of a catalyst for the reaction, and isolating the resulting polyurethane from the reaction mass.

5. A method as in claim 1 wherein the hydroxycarbamate is a primary β-hydroxy carbamate in which the —OH is attached directly to aliphatic carbon and the reaction between the urea and the said primary β-hydroxy carbamate, as sole reactants, is effected at a temperature between about 100° C. and about 200° C.

6. A method as in claim 1 wherein the hydroxycarbamate is a primary β-hydroxy carbamate in which the —OH is attached directly to aliphatic carbon and the reaction between the urea and the said primary β-hydroxy carbamate, as sole reactants, is effected at a temperature between about 100° C. and about 200° C. and in the presence of a catalyst for the reaction.

7. A method as in claim 6 wherein the primary β-hydroxy carbamate is a primary mono-β-hydroxy monocarbamate.

8. A method as in claim 6 wherein the primary β-hydroxy carbamate is a primary poly-β-hydroxy polycarbamate.

References Cited in the file of this patent

UNITED STATES PATENTS

| 659,202 | Bonhoeffer et al. | Oct. 9, 1900 |
| 1,817,992 | Leopold et al. | Aug. 11, 1931 |
| 2,409,712 | Schweitzer | Oct. 22, 1946 |
| 2,703,810 | Viard | Mar. 8, 1955 |

OTHER REFERENCES

Wagner et al.: "Synthetic Organic Chemistry" (1953), p. 647.

UNITED STATES PATENT OFFICE
Certificate of Correction

Patent No. 2,802,022             August 6, 1957

Stephen J. Groszos et al.

It is hereby certified that error appears in the printed specification of the above numbered patent requiring correction and that the said Letters Patent should read as corrected below.

Column 1, line 19, for "hexa," read —hexa-,—; column 3, line 48, after "e. g." insert a comma; column 9, line 21, for "disolved" read —dissolved—; lines 58 through 63, Example 10, the formula should appear as shown below instead of as in the patent—

(XIX) 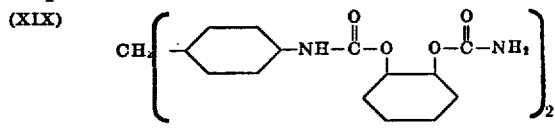

column 11, line 58, for "desired" read —desire—.

Signed and sealed this 8th day of October 1957.

[SEAL]

Attest:
KARL H. AXLINE,
*Attesting Officer.*

ROBERT C. WATSON,
*Commissioner of Patents.*